(12) United States Patent
Yu et al.

(10) Patent No.: US 11,626,700 B2
(45) Date of Patent: Apr. 11, 2023

(54) DC POWER CONNECTOR PLUG WITH IMPROVED POWER AND RIGIDITY

(71) Applicant: DELL PRODUCTS L.P., Round Rock, TX (US)

(72) Inventors: Wei Cheng Yu, New Taipei (TW); Andrew Sultenfuss, Leander, TX (US); Chi Che Wu, Taipei (TW); Tsung-Cheng Liao, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 17/182,863

(22) Filed: Feb. 23, 2021

(65) Prior Publication Data
US 2022/0271481 A1    Aug. 25, 2022

(51) Int. Cl.
| | |
|---|---|
| *H01R 24/38* | (2011.01) |
| *G06F 1/26* | (2006.01) |
| *H01R 13/428* | (2006.01) |
| *H01R 31/06* | (2006.01) |
| *H01R 43/20* | (2006.01) |
| *H01R 103/00* | (2006.01) |

(52) U.S. Cl.
CPC .............. *H01R 24/38* (2013.01); *G06F 1/26* (2013.01); *H01R 13/428* (2013.01); *H01R 31/065* (2013.01); *H01R 43/20* (2013.01); *H01R 2103/00* (2013.01)

(58) Field of Classification Search
CPC ......... G06F 1/26; H01R 13/428; H01R 24/38; H01R 31/065; H01R 43/20; H01R 2103/00
See application file for complete search history.

(56) References Cited

U.S. PATENT DOCUMENTS

| | | | |
|---|---|---|---|
| 6,869,316 B2 | 3/2005 | Hinkle et al. | |
| 8,861,173 B2 * | 10/2014 | Ikeda | H05H 1/46 |
| | | | 361/253 |

FOREIGN PATENT DOCUMENTS

| | | | |
|---|---|---|---|
| CN | 110984927 B | * | 7/2020 |
| JP | S5177719 A | * | 7/1976 |
| JP | 2009036198 A | * | 2/2009 |

* cited by examiner

*Primary Examiner* — Carl J Arbes
(74) *Attorney, Agent, or Firm* — Egan, Enders & Huston LLP.

(57) ABSTRACT

The present disclosure provides embodiments of direct current (DC) power connectors and methods to manufacture the same. More specifically, the present disclosure provides a connector plug with improved power capacity and structural rigidity. The connector plug includes an inner body and an outer body coupled to transmit power through the DC power connector, wherein the inner body is concentrically arranged within the outer body, and an insulating barrel that is coupled between the inner body and the outer body to electrically isolate the inner body from the outer body. The inner body and outer body comprise a base metal or metal alloy having an electrical conductivity ranging between 30% International Annealed Copper Standard (IACS) and greater than or equal to 99% IACS. In addition, the inner body, outer body and insulating barrel comprise an inter-locking feature, which increases the structural rigidity of the connector plug and prevents disassembly when the inner body, outer body and insulated barrel are assembled together.

18 Claims, 6 Drawing Sheets

DC POWER CONNECTOR PLUG WITH IMPROVED POWER AND RIGIDITY

FIELD

This invention relates generally to direct current (DC) power connectors, and more particularly, to improved barrel connector plug designs.

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The transmission of power and data to an information handling system is important, particularly with respect to portable devices (such as laptop computers, tablet computers, and other portable electronic devices) that are designed to operate on both battery power and power supplied by a wall outlet. As portable devices have become more advanced and able to perform more functions, the portable devices require more power to operate. Because batteries only last for a finite time before requiring a new charge, most portable devices are adapted to plug into a wall outlet providing alternating current (AC) power. But since portable devices primarily operate on direct current (DC) power, an AC adapter is required when powering a portable device from a wall outlet to convert the AC power into DC power.

Figure 1:
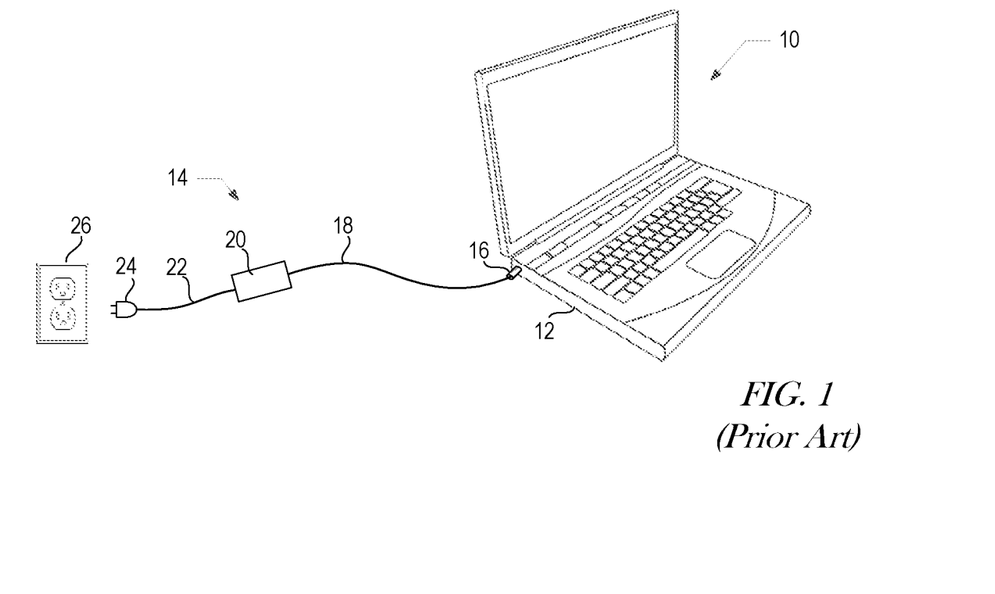
FIG. 1 (PRIOR ART) is a schematic diagram illustrating a portable information handling system (IHS) coupled for receiving DC power from a power assembly comprising a DC plug, electrical cable, AC adapter, power cord and AC plug.

An electrical cable (or "power cord") is generally used to transmit power and data from the AC adapter to the portable device. One end of the electrical cable may be fixedly or removably connected to the AC adapter, while the other end of the electrical cable terminates in a plug, which plugs into or mates with a jack (otherwise known as a "receptacle" or "socket") provided within the portable device. Together, the plug and the jack form a "power connector" through which DC power and data can be transmitted from the AC adapter to the portable device. FIG. 1 provides a schematic representation of a portable device coupled for receiving DC power from a power assembly comprising an AC adapter.

As shown in FIG. 1, portable information handling system (IHS) 10 is coupled for receiving DC power from a power assembly 14 comprising a DC plug 16, electrical cable 18, AC adapter 20, power cord 22 and AC plug 24. In the embodiment shown in FIG. 1, portable IHS 10 is illustrated as a laptop computer. However, it is recognized that portable IHS 10 may be any type of portable device that operates on battery power (DC power) but can also be plugged into an electrical outlet 26, via power assembly 14, to operate on power supplied by electrical outlet 26.

When AC plug 24 is plugged into electrical outlet 26, power assembly 14 allows alternating current (AC) to flow from electrical outlet 26 through power cord 22 to AC adapter 16. AC adapter 16 receives the AC power signal from electrical outlet 26 and converts it into a DC power signal that can be used to power the portable IHS 10 and/or recharge a battery provided therein. The DC power signal travels from AC adapter 16 along electrical cable 18 to DC plug 16, which is connected or plugged into a connector jack (not shown) included within a chassis 12 of the portable IHS 10.

In some cases, AC adapter 16 may provide data to the portable IHS 10 in addition to DC power. For example, AC adapter 16 may be a high power level AC adapter, a low power level AC adapter, a travel-sized AC adapter, or any other appropriate type of AC adapter. Each different type of AC adapter has a unique ID specific to the particular type of adapter. In some cases, AC adapter 16 may transmit a data signal containing the unique ID of the AC adapter to the portable IHS 10, so that the portable IHS will know what type of AC adapter the system is connected to.

A variety of DC power connectors may be used to supply DC power and data to a portable device, such as portable IHS 10. Examples of DC power connectors commonly used to provide power and data to portable devices include, but are not limited to, barrel connectors and Universal Serial Bus (USB) connectors.

A barrel connector (otherwise known as a "coaxial power connector" or "tip connector") includes a cylindrically-shaped plug, which is adapted for insertion within a correspondingly sized jack (or receptacle or socket). A barrel connector plug generally includes an outer body and an inner body, which is insulated from the outer body and configured to accept insertion of a pin provided within the jack. The outer body of the plug (which is typically referred to as the "barrel," "sleeve" or "ring") provides a first electrical contact for the plug. The inner body of the plug (called the "tip") provides a second electrical contact for the plug. In most cases, the outer body of the plug provides the negative polarity, while the inner body of the plug provides the positive polarity of the DC power supply. When the plug is inserted within an appropriately sized jack, a pin mounted within the jack comes in contact with the inner body of the plug to conduct current through the barrel connector. In some cases, the plug may further include a center body, which is concentrically arranged within the inner body and configured to conduct data signals through the barrel connector. The center body is often referred to as the power supply identification (PSID) pin, the ID pin or the communication pin.

Barrel connectors are commonly provided in a variety of different sizes, power/current ratings and designs. A common standard for defining barrel connector size is to specify the outer diameter (OD) of the barrel portion of the connector plug, often in conjunction with the diameter of the pin included within the connector jack. Although not limited to such, barrel connectors conventionally used in portable devices tend to have an outer diameter ranging between about 2.4 mm to about 7.4 mm. Smaller barrel connectors generally have lower power and current ratings than larger barrel connectors. For example, a 7.4 mm barrel connector may have a maximum power rating of 360 W and a maximum current rating of 18 A, whereas a 4.5 mm barrel connector may be limited to a maximum power rating of 200 W and a maximum current rating of 11 A.

Figure 2:
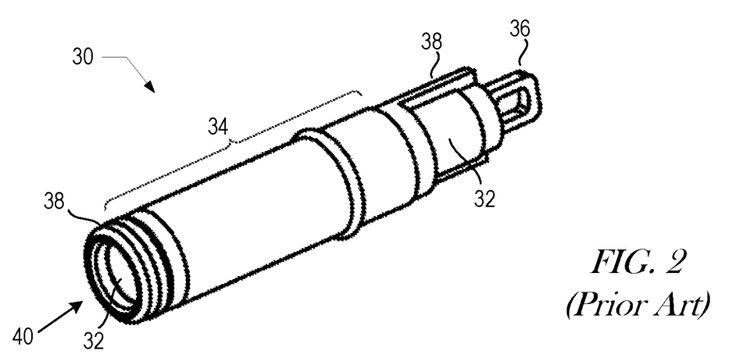
FIG. 2 (PRIOR ART) is perspective view of a conventional barrel connector plug without overmolding or attached electrical leads.
Figure 3:
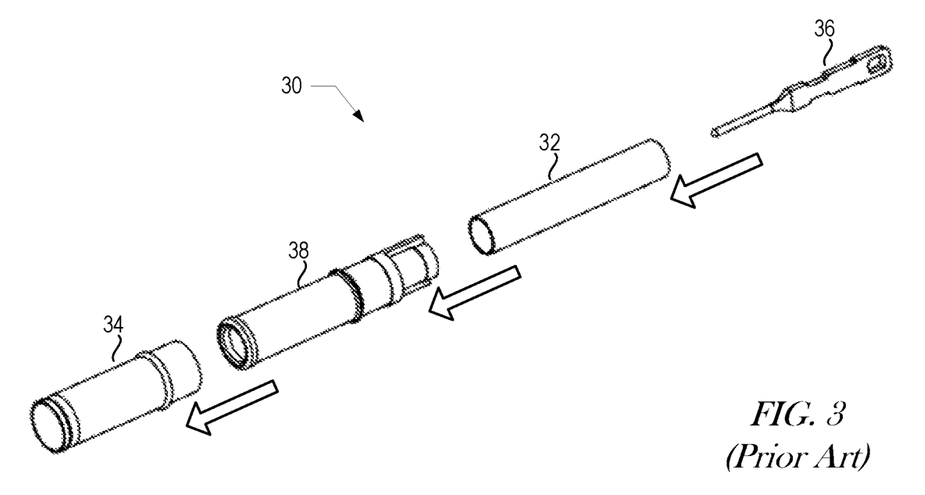
FIG. 3 (PRIOR ART) illustrates a process for assembling the conventional barrel connector plug shown in FIG. 2.

A conventional barrel connector plug design is illustrated in FIGS. 2-3. More specifically, FIG. 2 provides a perspective view of a conventional barrel connector plug 30 without overmoulding or attached electrical leads. FIG. 3 illustrates a process for press fitting components of the barrel connector plug 30 together. As shown in FIGS. 2-3, barrel connector plug 30 includes an inner body ("tip") 32 and outer body ("barrel") 34 for power transmission and a center body 36 for data transmission. Although not strictly limited to such, the outer body 34 may transmit a negative DC current, and the inner body 32 may transmit a positive DC current through the barrel connector plug 30. In some cases, the center body 36 may transmit a data signal containing a unique ID of the AC adapter 20 to the portable IHS 10 to identify the type of AC adapter 20 included within the power assembly 14. Other data signals may also be transmitted through the center body 36.

An insulating barrel 38 is provided between the inner body 32 and the outer body 34 to prevent the electrical current transmitted in the inner body 32 from coming into contact with the electrical current transmitted in the outer body 34. The insulating barrel 38 extends beyond distal ends of the inner body 32 and the outer body 34 to provide an insulated tip, which insulates a first end 40 of the barrel connector plug 30 from the connector jack (not shown) and prevents any electrical current run-off when the barrel connector plug 30 is coupled with connector jack.

The inner body 32 and outer body 34 may be generally formed from a base metal alloy (such as brass) and may have a contact surface plating of nickel or other suitable materials. Brass is commonly used to form the inner and outer bodies of the barrel connector plug 30, due to its high strength, good conductivity and good machinability. The strength of a material is often described in terms of yield tensile strength or ultimate tensile strength. The yield tensile strength (or yield point) of the material is defined as the stress at which a material begins to deform plastically. The ultimate tensile strength is a measurement of the force required to pull something to the point where it breaks. Depending on the particular alloy used, a brass alloy may have the yield tensile strength between 83 to 435 MPa and an ultimate tensile strength between 275 and 580 MPa.

Like the inner body 32 and outer body 34, the center body 36 may be generally formed from a base metal alloy (such as nickel) and may have a contact surface plating of gold or other suitable materials to increase electrical conductivity. The insulating barrel 38 is formed from a dielectric material, such as Polybutylene Terephthalate (PBT) or any other appropriate insulating material, to electrically isolate the inner body 32 from the outer body 34.

A variety of fabrication techniques may be used to form the inner body 32, outer body 34, center body 36 and insulating barrel 38. Once the individual components are formed, the components are press fit together to form the barrel connector plug 30 shown in FIG. 2. As shown in FIG. 3, for example, the insulating barrel 38 is press fit into the outer body 34, the inner body 32 is press fit into the insulating barrel 38, and the center body 36 is inserted within or press fit into the inner body 32. The inner body 32, insulating barrel 38 and outer body 34 each have a smooth inner and/or outer surface, which enables the components to be press fit together. Once assembled, the inner body 32, insulating barrel 38 and outer body 34 are held together by frictional engagement of the smooth inner/outer surfaces.

As portable devices become increasingly thinner, smaller DC power connectors with a lower z-height are needed to support lower profile devices. With the advent of USB-C, many portable devices have moved away from using barrel connectors in favor of the significantly thinner USB-C connector. For example, the z-height of a USB-C receptacle is roughly 3 mm, which is much thinner than the z-height (e.g., about 11 mm) of some conventional 7.4 mm barrel connectors or the z-height (e.g., about 5.7 mm) of some conventional 4.5 mm barrel connectors. Unfortunately, USB-C connectors can only provide up to 100 W power, and thus, cannot provide adequate power to portable devices that require higher power (>100 W). A need, therefore, exists for a DC power connector having both increased power capacity and decreased z-height.

SUMMARY OF THE INVENTION

The following description of various embodiments of direct current (DC) power plugs and related methods is not to be construed in any way as limiting the subject matter of the appended claims.

The present disclosure provides various embodiments of DC power connectors and methods to manufacture the same. More specifically, the present disclosure provides various embodiments of improved barrel connector plugs and associated manufacturing methods. Unlike conventional barrel connector plugs, the barrel connector plugs disclosed herein provide increased power capacity and decreased z-height.

According to one embodiment, a DC power connector including a connector plug and a connector jack is provided herein. The connector plug generally includes an inner body and an outer body coupled to transmit power through the DC power connector, wherein the inner body is concentrically arranged within the outer body. The connector plug further includes an insulating barrel, which is coupled between the inner body and the outer body to electrically isolate the inner body from the outer body. The inner body and the outer body may generally be formed from a first base metal or metal alloy, and the insulating barrel may be formed from a dielectric material. In some embodiments, the connector plug may further include a center body, which is concentrically arranged within the inner body and positioned within a center channel formed within the insulating barrel. The center body may be formed from a second base metal or metal alloy material, and may be configured to transmit data through the DC power connector.

In the present disclosure, the inner body, the outer body and the insulating barrel comprise an inter-locking feature, which increases a structural rigidity of the connector plug and prevents disassembly when the inner body, the outer body and the insulated barrel are assembled together. In some embodiments, the inter-locking feature may enable the inner body, the outer body and the insulating barrel to be screwed together. For example, portions of the inner body, the outer body and the insulating barrel may be threaded, so that during assembly, the inner body may be inserted within and screwed into the insulating barrel, and the insulating barrel may be inserted within and screwed into the outer body.

In one embodiment, the inner body may include a first set of threads formed on an outer surface of the inner body near a first distal end of the inner body. The insulating barrel may include a second set of threads formed on an inner surface, and a third set of threads formed on an outer surface, of the insulating barrel near a first distal end of the insulating barrel. The outer body may include a fourth set of threads formed on an inner surface of the outer body between a first distal end and a second distal end of the outer body. Once assembled, the first set of threads provided on the outer surface of the inner body engage with the second set of threads provided on the inner surface of the insulating barrel, and the third set of threads provided on the outer surface of the insulating barrel engage with the fourth set of threads provided on the inner surface of the outer body.

As noted above, the inner body and the outer body may be formed from a first base metal or metal alloy. To improve the power capacity of the connector plug, the first base metal or metal alloy may be a metal or metal alloy having an electrical conductivity ranging between 30% International Annealed Copper Standard (IACS) and greater than or equal to 99% IACS. In some embodiments, the first base metal or metal alloy may be a copper or copper alloy. Although not strictly limited to such, the copper or copper alloy may comprise one or more of the following: copper (Cu), iron (Fe), antimony (Sb), bismuth (Bi). In some embodiments, the first base metal or metal alloy may have a contact surface plating of nickel (Ni) or gold (Au) to increase the electrical conductivity of the inner body and the outer body.

In some embodiments, the DC power connector may be a barrel connector, and the connector plug may be a barrel connector plug. Although not limited to such, an outer diameter of the barrel connector plug may range between about 2 mm and about 8 mm. However, the barrel connector plug described herein is not limited to such a range and may be alternatively configured with substantially any outer diameter. In one embodiment, the barrel connector plug may be a 4.5 mm barrel connector plug configured to provide more than 300 W of power with a maximum current level of 17 A.

According to another embodiment, a method is provided herein to form a barrel connector plug. The method may generally include: forming an inner body and an outer body from a first base metal or metal alloy having an electrical conductivity ranging between 30% IACS and greater than or equal to 99% IACS; forming an insulating barrel from a dielectric material; and assembling the inner body, the outer body and the insulating barrel together by inserting the inner body within and screwing the inner body into the insulating barrel, and inserting the insulating barrel within and screwing the insulating barrel into the outer body.

In some embodiments, said forming the inner body and the outer body may include: forming a first set of threads on an outer surface of the inner body near a first distal end of the inner body; forming a second set of threads on an inner surface and a third set of threads on an outer surface of the insulating barrel near a first distal end of the insulating barrel; and forming a fourth set of threads on an inner surface of the outer body between a first distal end and a second distal end of the outer body. In such embodiments, said assembling the inner body, the outer body and the insulating barrel together may include: inserting the first distal end of the inner body into a second distal end of the insulating barrel and screwing the inner body into the insulating barrel, so as to engage the first set of threads formed on the outer surface of the inner body with the second set of threads formed on the inner surface of the insulating barrel; and inserting the first distal end of the insulating barrel into the second distal end of the outer body and screwing the insulating barrel into the outer body, so as to engage the third set of threads formed on the outer surface of the insulating barrel with the fourth set of threads formed on the inner surface of the outer body.

In some embodiments, the method may further include: inserting a center body into a second distal end of the inner body, such that the center body is concentrically arranged within the inner body and positioned within a center channel formed within the insulating barrel. In addition, the method may further include connecting a first wire to the inner body near the second distal end of the inner body; connecting a second wire to the outer body near the second distal end of the outer body; and connecting a third wire to a distal end of the center body protruding from the second distal end of the insulating barrel. Furthermore, the method may further include forming an overmold where the first wire, the second wire and the third wire are respectively connected to the inner body, the outer body and the distal end of the center body to complete the assembly of the barrel connector plug.

In some embodiments, said forming the inner body and the outer body may further include forming the inner body and the outer body from a copper or copper alloy. Although not strictly limited to such, the copper or copper alloy may comprise one or more of the following: copper (Cu), iron (Fe), antimony (Sb), bismuth (Bi). In some embodiments, said forming the inner body and the outer body may additionally include surface plating a contact surface of the first base metal or metal alloy with nickel (Ni) or gold (Au) to increase the electrical conductivity of the inner body and the outer body.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

The present disclosure provides various embodiments of DC power connectors and methods to manufacture the same. More specifically, the present disclosure provides various embodiments of improved barrel connector plugs and associated manufacturing methods. Unlike conventional barrel connector plugs, the barrel connector plugs disclosed herein provide both increased power capacity and decreased z-height.

As described in more detail below, the power capacity of the barrel connector plugs disclosed herein is increased by forming the inner body and the outer body of the connector plug with a base metal or metal alloy, which exhibits higher electrical conductivity (e.g., an electrical conductivity greater than 30% IACS) than the base metal alloys (e.g., brass) commonly used in conventional barrel connector plug designs. In one preferred embodiment, the inner body and the outer body of the improved barrel connector plug may be formed from copper or a copper alloy having an electrical conductivity greater than or equal to 99% IACS. Suitable copper and copper alloy materials include, but are not limited to, one or more of the following materials: copper (Cu), iron (Fe), antimony (Sb), and bismuth (Bi). In addition to high electrical conductivity, the copper or copper alloy used to form the inner body and the outer body of the improved barrel connector plug may also have relatively high hardness and strength. In some embodiments, the base metal or metal alloy of the inner body and the outer body of the improved barrel connector plug may have a contact surface plating of nickel (Ni), gold (Au) or other suitable materials to increase the electrical conductivity of the inner and outer body.

All metals conduct electricity because the metallic crystal structure allows the electrons to be mobile, not bound to a specific atom or molecule. Copper is the second best metallic conductor (at room temperature) only to silver. Brass alloys are generally formed by combining zinc with copper. Other materials—such as lead, tin, iron, aluminum, silicon, and manganese—may also be added to copper and zinc to produce different brass alloys. The addition of zinc enhances the tensile strength and ductility of the brass alloy, but reduces the electrical (and thermal) conductivity by limiting the mobility of the electrons in the metallic crystal structure. A typical brass alloy with 70% copper has an electrical conductivity, which is only 28% that of pure copper, based on the International Annealed Copper Standard (IACS). As the zinc content increases, the strength of the brass alloy increases, while the electrical conductivity decreases.

As noted above, brass is commonly used to form the inner body 32 and the outer body 34 of the conventional barrel connector plug 30, due to its high strength, good conductivity and good machinability. Although copper could be used in place of brass to increase the power capacity of the conventional barrel connector plug 30, copper is a much softer material than brass (e.g., bending strength 25.32 Kgf for copper vs 31.94 Kgf for brass). Thus, simply replacing brass with copper in the conventional barrel connector plug 30 would result in an unreliable plug design that may be easily bent or broken, especially in smaller barrel connector plugs (e.g., 5.5 mm plugs and smaller).

Figure 4:
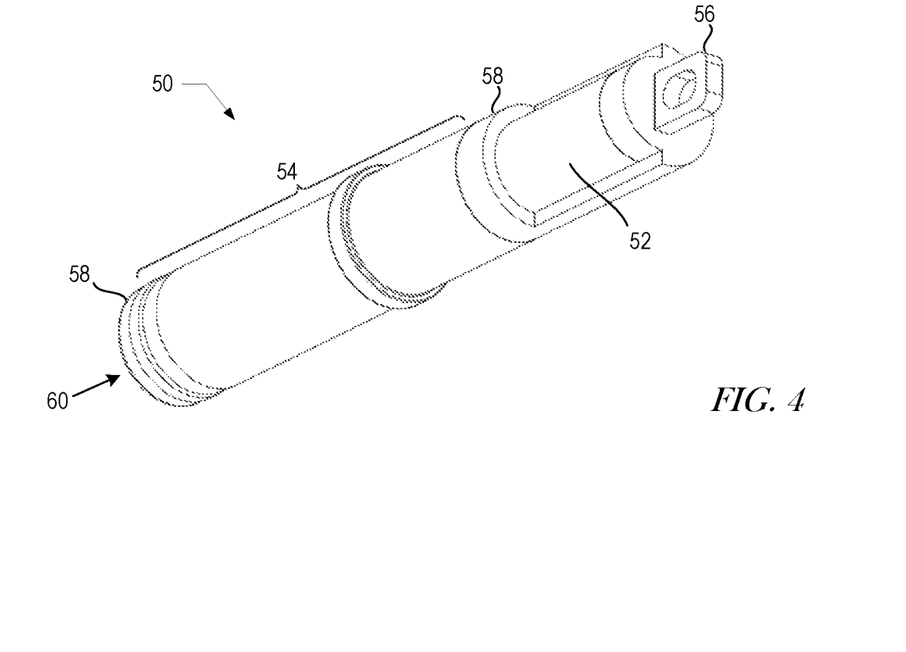
FIG. 4 is perspective view of an improved barrel connector plug, in accordance with one embodiment of the present disclosure, without overmolding or attached electrical leads.
Figure 5:
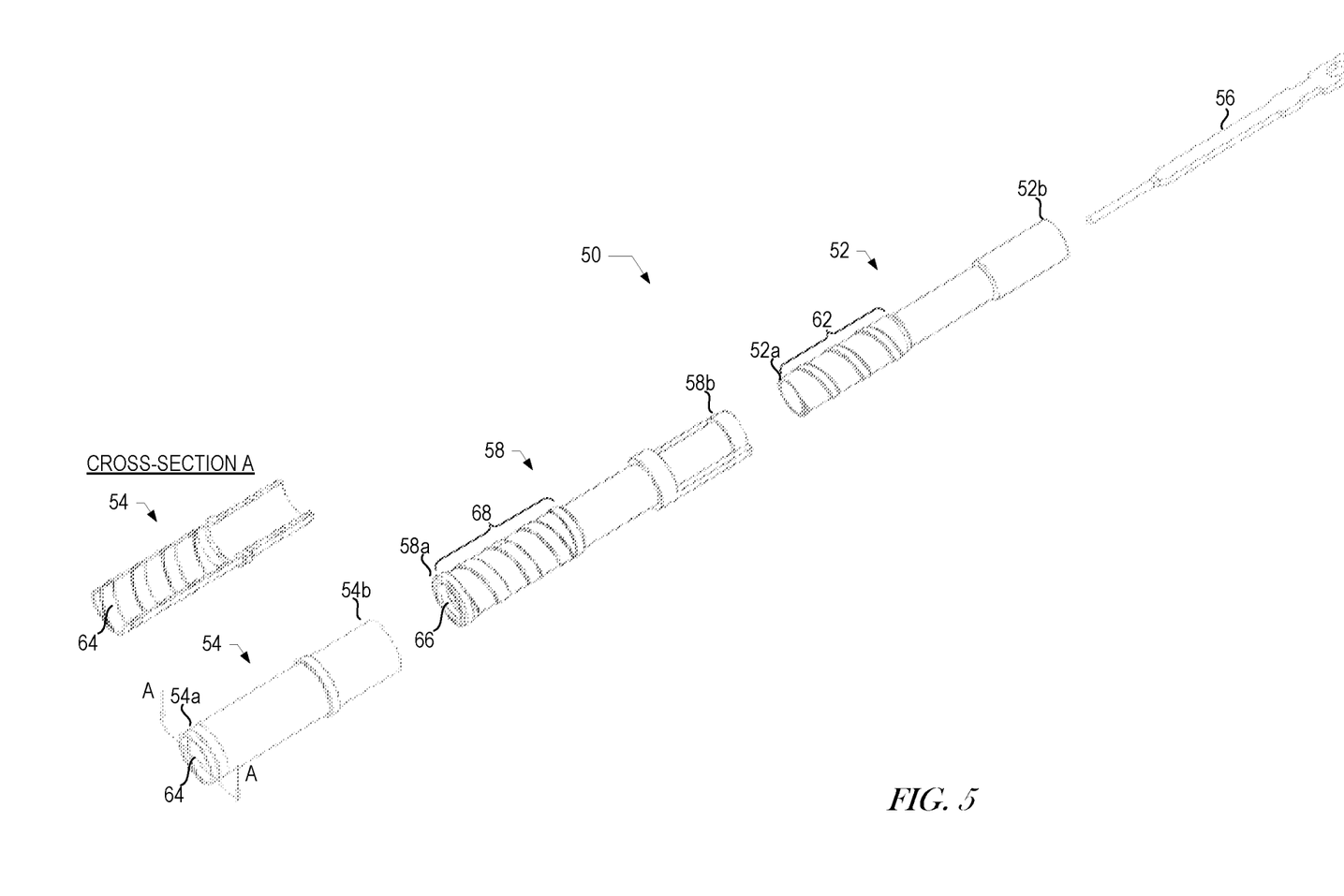
FIG. 5 illustrates a process for assembling the improved barrel connector plug shown in FIG. 4.
Figure 6:
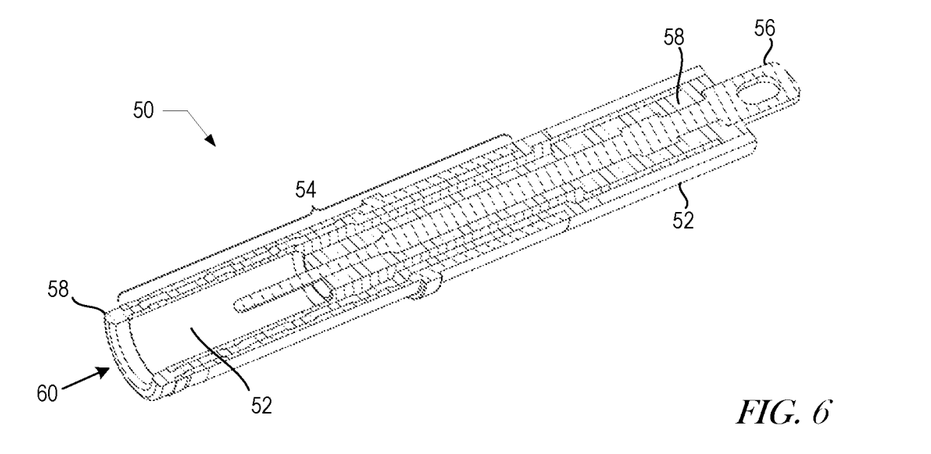
FIG. 6 illustrates a cross-sectional view of the improved barrel connector plug shown in FIGS. 4 and 5 taken along a length of the barrel connector plug.

FIGS. 4-6 illustrate one embodiment of an improved barrel connector plug 50, which overcomes the problems associated with conventional barrel connector plugs. A perspective view of the improved barrel connector plug 50 (without overmolding or attached electrical leads) is shown in FIG. 4. FIG. 5 illustrates a process for assembling individual components of the barrel connector plug 50 together, and FIG. 6 illustrates a cross-sectional view of the barrel connector plug 50 taken along a length of the barrel connector plug. As described in more detail below, the improved barrel connector plug 50 shown in FIGS. 4-6 provides improved power/current capacity compared to conventional barrel connector plugs (such as connector plug 30) of the same size. The improved barrel connector plug 50 also provides an inter-locking feature, which increases a structural rigidity and prevents disassembly of the barrel connector plug 50 when the individual components are assembled together.

Like the conventional barrel connector plug 30 shown in FIGS. 2-4, the improved barrel connector plug 50 shown in FIGS. 4-6 includes an inner body (or "tip") 52 and outer body (or "barrel") 54 for power transmission, a center body 56 for data transmission, and an insulating barrel 58 for electrically isolating the inner body 52 from the outer body 54. In some embodiments, the outer body 54 may transmit a negative DC current, and the inner body 52 may transmit a positive DC current through the barrel connector plug 50. The opposite may be true, in other embodiments.

As shown in FIGS. 4 and 6, the inner body 52 is concentrically arranged within the outer body 54. The insulating barrel 58 is provided between the inner body 52 and the outer body 54 to prevent the electrical current transmitted in the inner body 52 from coming into contact with the electrical current transmitted in the outer body 54. The insulating barrel 58 extends beyond distal ends of the inner body 52 and the outer body 54 to provide an insulated tip, which insulates a first end 60 of the barrel connector plug 50 from the connector jack (not shown) and prevents any electrical current run-off when the barrel connector plug 50 is coupled with connector jack. The center body 56 is concentrically arranged within the inner body 52 and positioned within a center channel formed within the insulating barrel 58, as shown in FIG. 6.

As noted above, the inner body 52 and the outer body 54 may be generally formed from a base metal or metal alloy, which exhibits higher electrical conductivity than the base metal alloys (e.g., brass) commonly used in conventional barrel connector plug designs. In one preferred embodiment, the inner body 52 and the outer body 54 may be formed from a copper or copper alloy having an electrical conductivity ranging between approximately 30% IACS and greater than or equal to 99% IACS. Suitable copper and copper alloy materials include, but are not limited to one or more of the following materials: copper (Cu), iron (Fe), antimony (Sb) and bismuth (Bi). In addition to high electrical conductivity, the copper or copper alloy used to form the inner body 52 and the outer body 54 may also have high conductivity and high strength. In some embodiments, the base metal or metal alloy of the inner body 52 and the outer body 54 may have a contact surface plating of nickel (Ni), gold (Au) or other suitable materials to increase the electrical conductivity of the inner and outer body.

Like the inner body 52 and the outer body 54, the center body 56 may be generally formed from a base metal or metal alloy, such as for example, steel. Examples of other suitable base metal or metal alloys used to form the center body 56 include, but are not limited to, silicon (Si), manganese (Mn), and carbon (C). In some embodiments, the center body 56 may have a contact surface plating of gold, copper, nickel or other suitable materials to increase the electrical conductivity of the center body 56. The insulating barrel 38 may be generally formed from a dielectric material. Examples of dielectric materials used to form the insulating barrel 38 include, but are not limited to, PBT, glass fiber and other appropriate dielectric materials.

A variety of fabrication techniques may be used to form the inner body 52, the outer body 54, the center body 56 and the insulating barrel 58. For example, the inner body 52 and the outer body 54 may be formed via a stretch forming, computer numerical control (CNC), or turnery process. Likewise, the insulating barrel 58 may be formed via an injection molding process. In addition, the center body 56 may be formed via a metal cutting or stamping process.

As noted above, the inner body 52 and the outer body 54 are formed from a copper or copper alloy material to increase the power capacity of the improved barrel connector plug 50. In addition to the particular material and thickness of the conductive material chosen to form the inner body 52 and the outer body 54, the power capacity of the barrel connector plug 50 may also be dependent on the size of the barrel conductor plug, and the material and thickness of the insulating barrel 58. In one preferred embodiment, an improved 4.5 mm barrel connector plug 50 may comprise an inner body 52 of red copper having a thickness ranging between 0.2 mm and 0.28 mm, an outer body 54 of red copper having a thickness ranging between 0.2 mm and 0.28 mm, and an insulating barrel 58 of PBT having a thickness ranging between 0.32 mm and 0.33 mm.

When configured as described above, the improved 4.5 mm barrel connector plug 50 may provide up to 300 W (or more) of power. In one particular embodiment, the improved 4.5 mm barrel connector plug 50 may provide up to approximately 330 W of power with a maximum current level of 17 A. This represents a significant improvement over conventional 4.5 mm barrel connector plug designs (such as conventional barrel connector plug 30), which are limited to 200 W of power with a maximum current level of 11 A. Although described in the context of a 4.5 mm barrel connector plug, one skilled in the art would understand how the techniques described herein could be used to improve the power/current carrying capacity of barrel connector plugs of substantially any size. For example, the techniques described herein can be used to improve the power/current carrying capacity of barrel connector plugs having an outer diameter ranging between about 2 mm and about 8 mm. In one example embodiment, the techniques described herein can be used to improve the power/current carrying capacity of 7.4 mm barrel connector plugs (i.e., plugs having an outer diameter of 7.4 mm).

As noted above, copper is a much softer material than brass, and thus, is more susceptible to bending and breaking, especially when used within smaller barrel connector plugs (e.g., 5.5 mm plugs and smaller). In order to improve the structural rigidity and reliability of the improved barrel connector plug 50, the inner body 52, the outer body 54 and the insulating barrel 58 are provided with an inter-locking feature that allows the components to be screwed, rather than press fit, together. In addition to providing structural rigidity, the inter-locking feature improves the reliability of the improved barrel connector plug 50 by preventing bending, breaking and disassembly of the individual plug components, thereby providing a more robust plug design and durable lifespan.

FIGS. 5 and 6 illustrate the inter-locking feature of the improved barrel connector plug 50, according to one embodiment of the present disclosure. As shown in FIGS. 5-6, portions of the inner body 52, the outer body 54 and the insulating barrel 58 are threaded, so that the inner body 52 can be inserted within and screwed into the insulating barrel 58, and the insulating barrel 58 can be inserted within and screwed into the outer body 54. More specifically, an outer surface of the inner body 52 includes a first set of threads 62 formed near a first distal end 52*a* of the inner body 52. The insulating barrel 58 includes a second set of threads 66 formed on the inner surface, and a third set of threads 68 formed on the outer surface, of the insulating barrel 58 near a first distal end 58*a* of the insulating barrel. An inner surface of the outer body 54 includes a fourth set of threads 64 formed between a first distal end 54*a* and a second distal end 54*b* of the outer body 54. The outer surface of the outer body 54 is substantially smooth, so as to provide smooth contact surface engagement with a connector jack (not shown).

To assemble the improved barrel connector plug 50, the first distal end 52*a* of the inner body 52 is inserted into the second distal end 58*b* of the insulating barrel 58 and screwed in, so as to engage the first set of threads 62 provided on the outer surface of the inner body 52 with the second set of threads 66 provided on the inner surface of the insulating barrel 58. The first distal end 58*a* of the insulating barrel 58 is inserted into the second distal end 54*b* of the outer body 54 and screwed in, so as to engage the third set of threads 68 provided on the outer surface of the insulating barrel 58 with the fourth set of threads 64 provided on the inner surface of the outer body 54. The center body 56 is inserted into the second distal end 52*b* of the inner body 52 and the second distal end 58*b* of the insulating barrel 58 to complete the assembly of the individual components of the barrel connector plug 50. Although described in a particular assembly order, one skilled in the art would understand how the individual components of the barrel connector plug 50 may be assembled in substantially any order without departing from the scope of the present disclosure.

Figure 7:
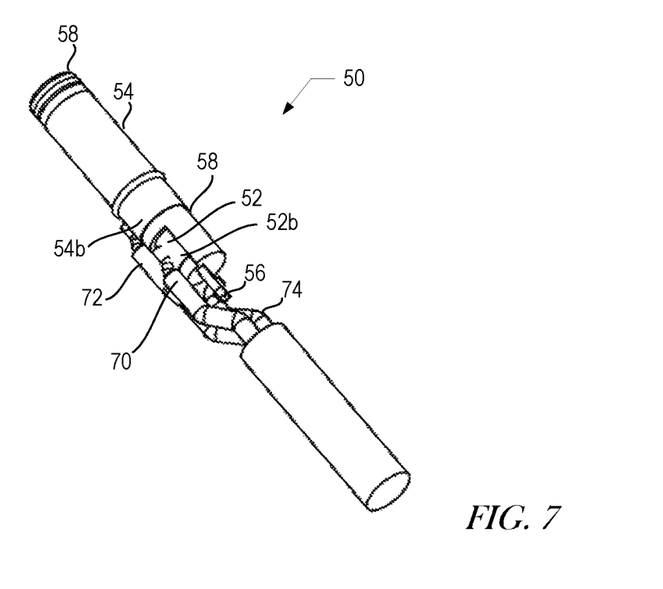
FIG. 7 is a side view of the improved barrel connector plug shown in FIGS. 4 and 5 after electrical leads have been connected thereto.

Once the inner body 52, the outer body 54, the center body 56 and the insulating barrel 58 are assembled as shown in FIGS. 4-6 and described above, three separate wires may be connected to the inner body 52, the outer body 54 and the center body 56 to enable power and data transmission. As shown in FIG. 7, for example, a first wire 70 may be soldered to the inner body 52 near the second distal end 52*b* of the inner body, a second wire 72 may be soldered to the outer body 54 near the second distal end 54*b* of the outer body, and a third wire 74 may be soldered to a distal end of the center body 56 protruding from the second distal end 58*b* of the insulating barrel 58. In some embodiments, the first wire 70 may transmit a positive DC current and the second wire 72 may transmit a negative DC current from an AC adapter (such as AC adapter 20 of FIG. 1) to the barrel connector plug 50. The third wire 74 may transmit a data signal from an AC adapter to the barrel connector plug 50.

Figure 8:
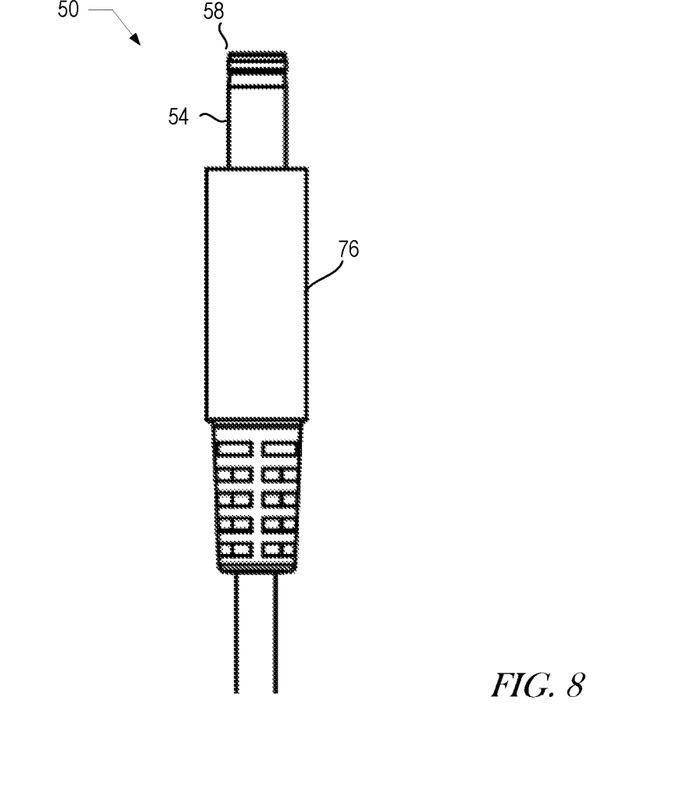
FIG. 8 is a side view of the improved barrel connector plug shown in FIGS. 4 and 5 after overmolding has been formed to complete the barrel connector plug.

After the wires 70, 72 and 74 are connected, an overmold 76 may be formed to provide protection where the wires connect to the inner body 52, the outer body 54 and the center body 56, as shown in FIG. 8. The overmold 76 protects the inner body 52, the outer body 54 and the center body 56 from damage and protects a user from electrical shock when inserting and removing the barrel connector plug 50 from a connector jack (not shown). The overmold 76 may also provide a place for a user to grab and grip the barrel connector plug 50 to facilitate the insertion and removal of the barrel connector plug into and out of a connector jack. The overmold 76 is generally comprised of a dielectric material, such as Polyvinyl Chloride (PVC) or any other appropriate insulating material. One example embodiment of an overmold 76 is shown in FIG. 8. Although the overmold 76 is configured in FIG. 8 to form a straight barrel connector plug 50, one skilled in the art would understand how the overmold 76 may be alternatively configured to form a right angle barrel connector plug, in other embodiments.

As explained above, the improved barrel connector plug 50 shown in FIGS. 4-8 provides improved power/current capacity compared to conventional barrel connector plug designs of the same size. Improving the power/current capacity of the barrel connector plug 50 enables smaller power connectors to be used within portable devices, while maintaining desired power levels. In one embodiment, for example, the techniques described herein may be used to form a 4.5 mm barrel connector plug capable of providing up to 300 W (or more) of power and up to 17 A of current, which may be ideal for some high power, low profile portable devices. In addition to improving power/current capacity, the techniques described herein improve the structural rigidity and reliability of the barrel connector plug 50 by providing an inter-locking feature and improved assembly method.

Figure 9:
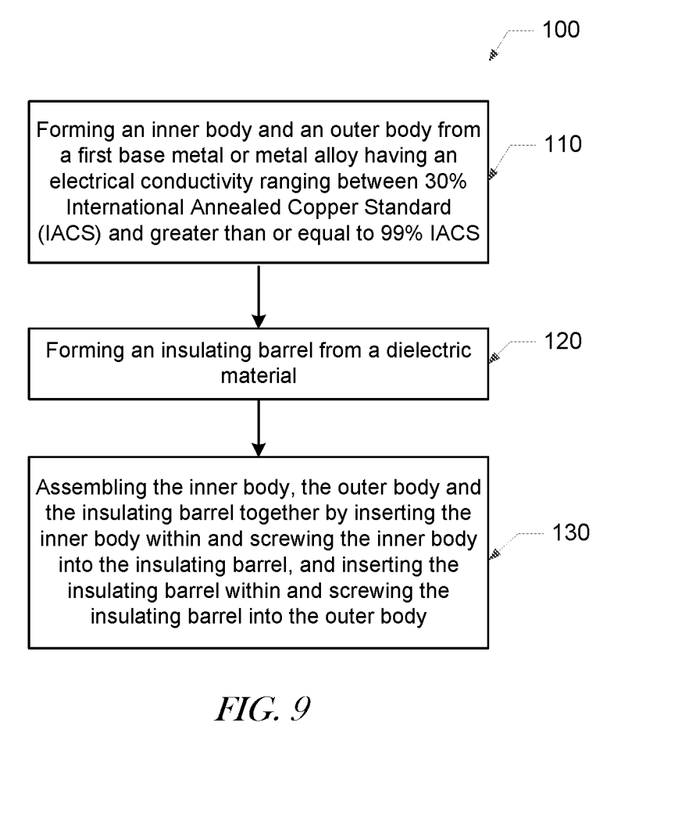
FIG. 9 is a flowchart diagram illustrating one embodiment of a method to form a barrel connector plug, in accordance with the present disclosure.

FIG. 9 illustrates one embodiment of an improved method 100 that may be used to form a barrel conductor plug, as shown and described above. As shown in FIG. 9, method 100 may generally include forming an inner body and an outer body from a first base metal or metal alloy having an electrical conductivity ranging between approximately 30% IACS and 99% IACS (or more) (in step 110); forming an insulating barrel from a dielectric material (in step 120); and assembling the inner body, the outer body and the insulating barrel together by inserting the inner body within and screwing the inner body into the insulating barrel, and inserting the insulating barrel within and screwing the insulating barrel into the outer body (in step 130).

In some embodiments, the inner body and the outer body may be from a copper or copper alloy in step 110. Although not strictly limited to such, the copper or copper alloy may comprise one or more of the following: copper (Cu), iron (Fe), antimony (Sb), and bismuth (Bi). In some embodiments, step 110 may further include surface plating a contact surface of the first base metal or metal alloy with nickel (Ni) or gold (Au) to increase the electrical conductivity of the inner body and the outer body.

In some embodiments, step 110 may include forming threads on portions of the inner body, the outer body and the insulating barrel. For example, step 110 may include forming a first set of threads on an outer surface of the inner body near a first distal end of the inner body; forming a second set of threads on an inner surface and a third set of threads on an outer surface of the insulating barrel near a first distal end of the insulating barrel; and forming a fourth set of threads on an inner surface of the outer body between a first distal end and a second distal end of the outer body.

In such embodiments, step 130 may include inserting the first distal end of the inner body into a second distal end of the insulating barrel and screwing the inner body into the insulating barrel, so as to engage the first set of threads formed on the outer surface of the inner body with the second set of threads formed on the inner surface of the insulating barrel. Step 130 may further include inserting the first distal end of the insulating barrel into the second distal end of the outer body and screwing the insulating barrel into the outer body, so as to engage the third set of threads formed on the outer surface of the insulating barrel with the fourth set of threads formed on the inner surface of the outer body.

In some embodiments, the method 100 may include additional steps not shown in FIG. 9. For example, the method 100 may include: inserting a center body into a second distal end of the inner body, such that the center body is concentrically arranged within the inner body and positioned within a center channel formed within the insulating barrel. In addition, the method 100 may include connecting a first wire to the inner body near the second distal end of the inner body; connecting a second wire to the outer body near the second distal end of the outer body; and connecting a third wire to a distal end of the center body protruding from the second distal end of the insulating barrel. Furthermore, the method 100 may include forming an overmold where the first wire, the second wire and the third wire are respectively connected to the inner body, the outer body and the distal end of the center body to complete the assembly of the barrel connector plug.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, Internet of Things (IoT) device, or any other suitable device and may vary in size, shape, performance, functionality, and price. The information handling system may generally include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A method to form a direct current (DC) barrel connector plug, the method comprising:
   forming an inner body and an outer body from a first base metal or metal alloy;
   forming an insulating barrel from a dielectric material; and
   assembling the inner body, the outer body and the insulating barrel together to form the DC barrel connector plug by inserting the inner body within and screwing the inner body into the insulating barrel, and inserting the insulating barrel within and screwing the insulating barrel into the outer body.

2. The method as recited in claim 1, wherein the assembling comprises:
assembling the inner body, the outer body and the insulating barrel together so that the inner body is concentrically arranged within the outer body; and
wherein the inner body and the outer body are configured to transmit power.

3. The method as recited in claim 1, wherein portions of the inner body, the outer body and the insulating barrel are threaded.

4. The method as recited in claim 1, wherein:
the inner body includes a first set of threads formed on an outer surface of the inner body near a first distal end of the inner body;
the insulating barrel includes a second set of threads formed on an inner surface, and a third set of threads formed on an outer surface, of the insulating barrel near a first distal end of the insulating barrel; and
the outer body includes a fourth set of threads formed on an inner surface of the outer body between a first distal end and a second distal end of the outer body.

5. The method as recited in claim 4, wherein said assembling the inner body, the outer body and the insulating barrel together comprises:
engaging the first set of threads provided on the outer surface of the inner body with the second set of threads provided on the inner surface of the insulating barrel; and
engaging the third set of threads provided on the outer surface of the insulating barrel with the fourth set of threads provided on the inner surface of the outer body.

6. The method as recited in claim 1, wherein the first base metal or metal alloy has an electrical conductivity ranging between 30% International Annealed Copper Standard (IACS) and greater than or equal to 99% IACS.

7. The method as recited in claim 6, wherein the first base metal or metal alloy comprises a copper or copper alloy.

8. The method as recited in claim 7, wherein the copper or copper alloy comprises one or more of the following: copper (Cu), iron (Fe), antimony (Sb) and bismuth (Bi).

9. The method as recited in claim 1, wherein the first base metal or metal alloy has a contact surface plating of nickel (Ni) or gold (Au) to increase the electrical conductivity of the inner body and the outer body.

10. The method as recited in claim 1, further comprising forming a center body from a second base metal or metal alloy material and forming a center channel within the insulating barrel, wherein the center body is concentrically arranged within the inner body and positioned within the center channel formed within the insulating barrel, and wherein the center body is configured to transmit data.

11. The method as recited in claim 1, wherein an outer diameter of the DC power connector barrel connector plug ranges between about 2 mm and about 8 mm.

12. The method as recited in claim 1, wherein the barrel connector plug is a 4.5 mm barrel connector plug configured to transmit more than 300 W of power with a maximum current level of 17 A.

13. The method as recited in claim 1, wherein said forming the inner body and the outer body comprise:
forming a first set of threads on an outer surface of the inner body near a first distal end of the inner body;
forming a second set of threads on an inner surface and a third set of threads on an outer surface of the insulating barrel near a first distal end of the insulating barrel; and
forming a fourth set of threads on an inner surface of the outer body between a first distal end and a second distal end of the outer body.

14. The method as recited in claim 13, wherein said assembling the inner body, the outer body and the insulating barrel together comprises:
inserting the first distal end of the inner body into a second distal end of the insulating barrel and screwing the inner body into the insulating barrel, so as to engage the first set of threads formed on the outer surface of the inner body with the second set of threads formed on the inner surface of the insulating barrel; and
inserting the first distal end of the insulating barrel into the second distal end of the outer body and screwing the insulating barrel into the outer body, so as to engage the third set of threads formed on the outer surface of the insulating barrel with the fourth set of threads formed on the inner surface of the outer body.

15. The method as recited in claim 1, further comprising:
inserting a center body into a second distal end of the inner body, such that the center body is concentrically arranged within the inner body and positioned within a center channel formed within the insulating barrel;
connecting a first wire to the inner body near the second distal end of the inner body;
connecting a second wire to the outer body near the second distal end of the outer body;
connecting a third wire to a distal end of the center body protruding from the second distal end of the insulating barrel; and
forming an overmold where the first wire, the second wire and the third wire are respectively connected to the inner body, the outer body and the distal end of the center body.

16. The method as recited in claim 1, wherein said forming the inner body and the outer body further comprises forming the inner body and the outer body from a copper or copper alloy.

17. The method as recited in claim 16, wherein the copper or copper alloy comprises one or more of the following: copper (Cu), iron (Fe), antimony (Sb) and bismuth (Bi).

18. The method as recited in claim 1, wherein said forming the inner body and the outer body further comprises surface plating a contact surface of the first base metal or metal alloy with nickel (Ni) or gold (Au) to increase the electrical conductivity of the inner body and the outer body.

* * * * *